Nov. 15, 1927.
E. C. BANK
1,649,649
SPRINKLER STAND
Filed June 21, 1926
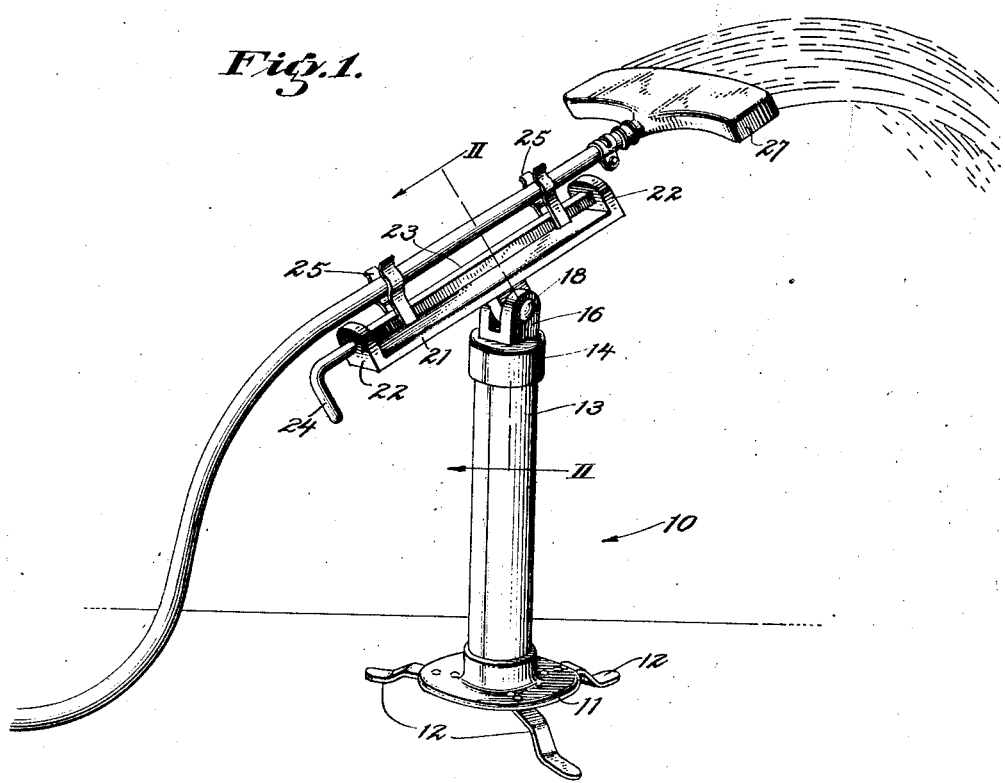
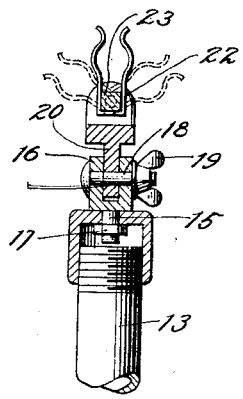
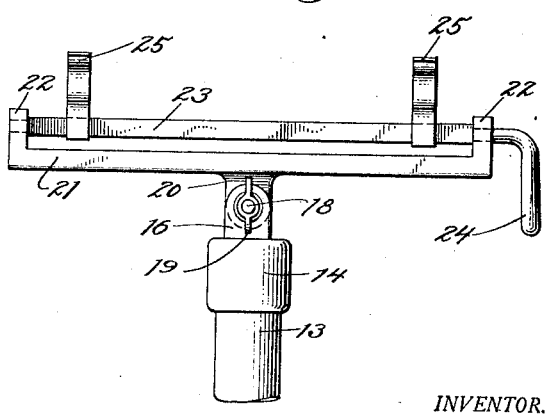
INVENTOR.
Edward Carl Bank
BY
Townsend, Loftus & Abbett
ATTORNEYS.

Patented Nov. 15, 1927.

1,649,649

UNITED STATES PATENT OFFICE.

EDWARD CARL BANK, OF BERKELEY, CALIFORNIA.

SPRINKLER STAND.

Application filed June 21, 1926. Serial No. 117,412.

This invention relates to a sprinkler stand and particularly pertains to means for adjustably supporting a spray nozzle and hose.

It is the principal object of the present invention to provide a simple stand structure by which a water hose may be detachably supported and the spray nozzle of which hose may be adjustably positioned to spray a desired area of lawn, said structure being capable of adjustably supporting the spray nozzle in any desired angular position in both horizontal and vertical planes.

The present invention contemplates the use of a base or stand upon which a hose receiving clamp is mounted. The mounting being so designed as to permit the clamp structure to swing in a horizontal plane or to assume any desired angular position in a vertical plane.

The invention is illustrated by way of example in the accompanying drawing, in which:

Fig. 1 is a perspective view showing the present invention and the manner in which it may be used.

Fig. 2 is an enlarged view in transverse section through the structure as seen on the line II—II of Fig. 1.

Fig. 3 is an enlarged view in side elevation showing the manner in which the hose supporting clamp is mounted for vertical adjustment.

Referring more particularly to the drawing, 10 indicates a stand. This stand comprises a base flange 11 carrying suitable feet 12. The base flange 11 receives a vertical stem 13 at the upper end of which a cap 14 is secured. The end of the cap is formed with an opening through which a threaded shank 15 of a boss structure 16 extends. This shank is secured through the opening in the cap by a nut 17. The boss structure comprises a pair of bearing members through which a bolt 18 extends, and which bolt is held in position by a wing nut 19. The bolt 18 extends through a bearing flange 20 formed as part of the hose clamp base 21.

It will thus be evident that the member 21 may move in a horizontal plane as it turns on the axis of the threaded shank 15, and that it may assume any desired vertical angle as it swings on the axis of the bolt 18. The clamp base 21 is formed with upwardly extending lugs 22 at its opposite ends. These lugs provide bearings for a shaft 23. The shaft 23 extends parallel to the base 21 and terminates at one end in a handle 24 by which it may be rotated in the lugs 22. Secured to the shaft 23 at points near the lugs 22 are suitable hose receiving and clamping fingers 25. These clamps, as shown in Fig. 2 of the drawing, each comprise a pair of spring clamping fingers suitably formed to accommodate a lawn sprinkling hose and to permit the hose to be detachably but firmly held thereby.

In operation of the present invention a sprinkling hose 26 may be positioned between the fingers of the clamps 25, as shown in Fig. 1 of the drawing. This particular hose is here shown as being provided with a spray nozzle having a rectangular spray area extending transversely of the longitudinal axis of the hose. It will be understood, however, that other types of nozzles may be used if desired.

When it is desired to spray a large area of lawn, the clamp base 21 may be disposed at an angle which will cause the nozzle to spread the spray. In the event that a fine spray is desired in a limited area, the hose may be swung upwardly, and when a large amount of water is desired in a small area, it may be swung downwardly around the axis of the bolt 18. In certain instances it may be desirable to supply a large amount of water to a small area as, for example, in a fence corner. In that case the hose may be swung around the longitudinal axis of the supporting shaft 23, as indicated by dotted lines in Fig. 2 of the drawing. In that event the nozzle 27 will be disposed with the longer dimensions of its spray faced in a vertical plane.

It will thus be seen that by the arrangement here disclosed a sprinkling hose with its nozzle may be conveniently supported and manipulated to cause the spray to be directed to any desired area, and with variable desired volumes of spray, while the nozzle may be adjustably supported in any position in a horizontal plane or disposed at any angle in a vertical plane as well as swung to various angular positions around the longitudinal axis of the hose support.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A device of the character described comprising a base member, an upright standard carried thereby, a bearing structure mounted upon the upper end of said standard and adapted to rotate horizontally with relation thereto, a hose clamp base extending substantially at right angles to the longitudinal axis of the standard and pivoted to the bearing structure for vertical swinging movement, a longitudinally extending shaft carried by the hose clamp base and adapted to rotate on its longitudinal axis, hose clamps mounted upon said shaft and by which a lawn hose may be detachably and rigidly held, and means for rotating said clamp shaft to swing the hose around the longitudinal axis thereof.

EDWARD CARL BANK.